United States Patent
Allinquant

[15] 3,641,625
[45] Feb. 15, 1972

[54] MEAT-TENDERIZING MACHINE
[72] Inventor: Fernand Stanislas Allinquant, 53, Avenue le Notre, 92 Sceaux, France
[22] Filed: Dec. 7, 1970
[21] Appl. No.: 95,931

Related U.S. Application Data

[63] Continuation of Ser. No. 756,619, Aug. 30, 1969, abandoned.

[30] Foreign Application Priority Data

Aug. 19, 1968 France..................163437

[52] U.S. Cl..................................................17/25
[51] Int. Cl.................................................A22c 9/00
[58] Field of Search.................................17/25, 28

[56] References Cited

UNITED STATES PATENTS 3,334,377 8/1967 Soodalter...........................17/25 X
3,413,681 12/1968 Manaster............................17/25

FOREIGN PATENTS OR APPLICATIONS 1,216,632 11/1959 France..................................17/25

Primary Examiner—Lucie H. Laudenslager
Attorney—Cumpston, Shaw & Stephens

[57] ABSTRACT

The invention relates to a meat-tenderizing machine comprising a belt conveyor carrying a piece of meat to be tenderized and a block of blade plates above the conveyor and the plates of which are parallel to the advance direction of the conveyor. An electromechanical device causes a reciprocating movement of the block and an advance movement of the conveyor to take place alternately, the advance movement being a multiple of the step of the blades, so that the blades always penetrate into the piece of meat at the same places thereof.

8 Claims, 6 Drawing Figures

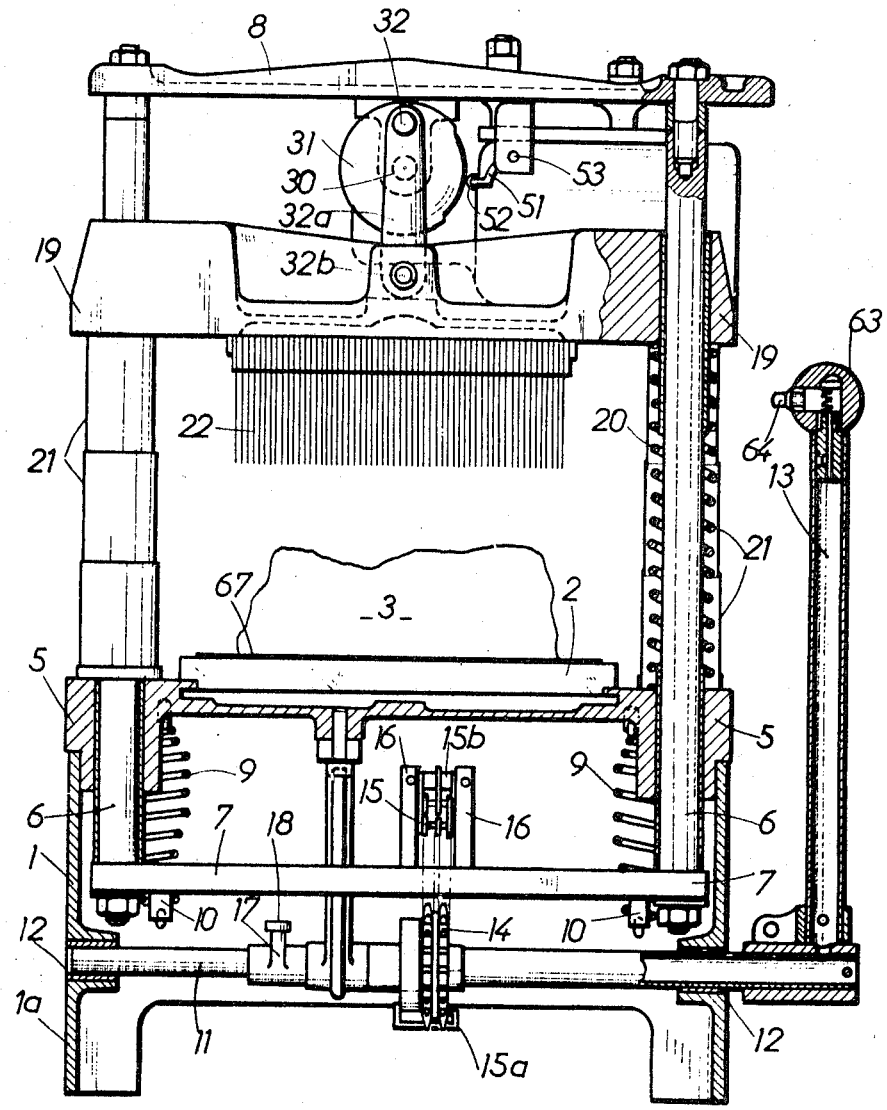
FIG.:1
INVENTOR
FERNAND STANISLAS ALLINQUANT
By Crumpston, Shaw & Stephens
ATTORNEYS

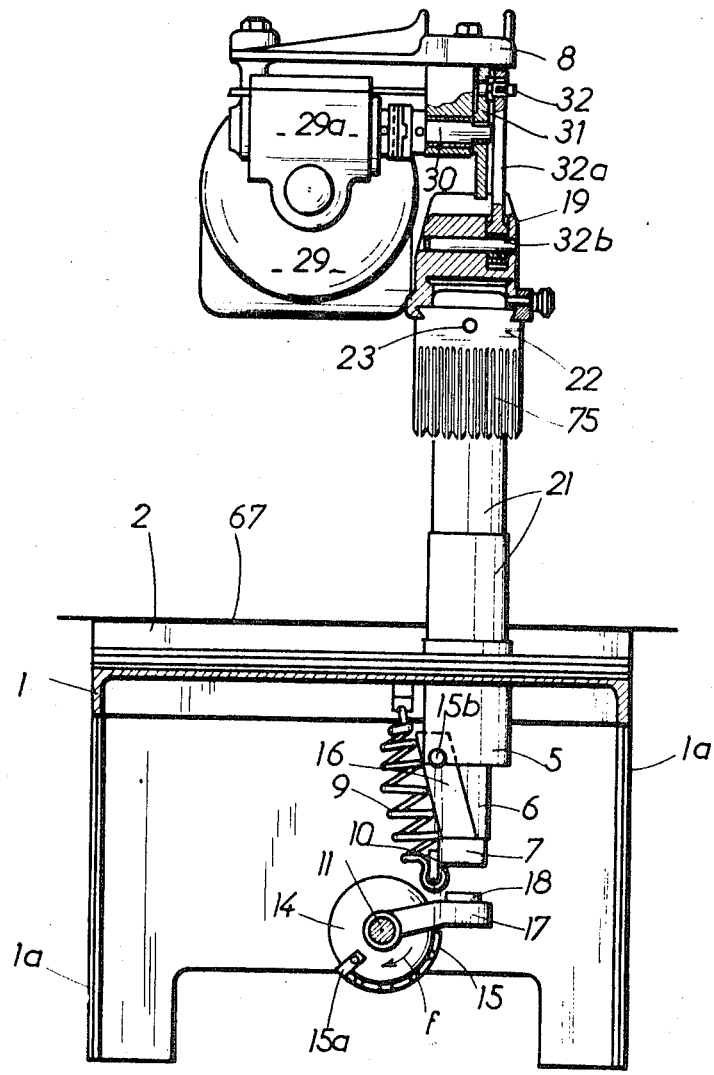
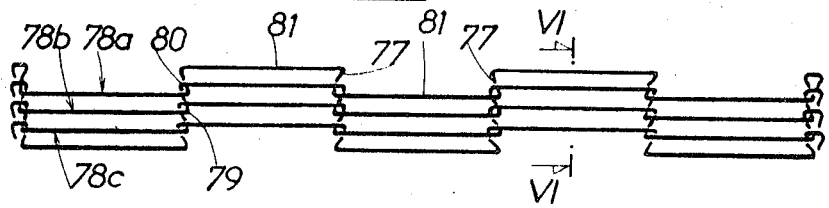

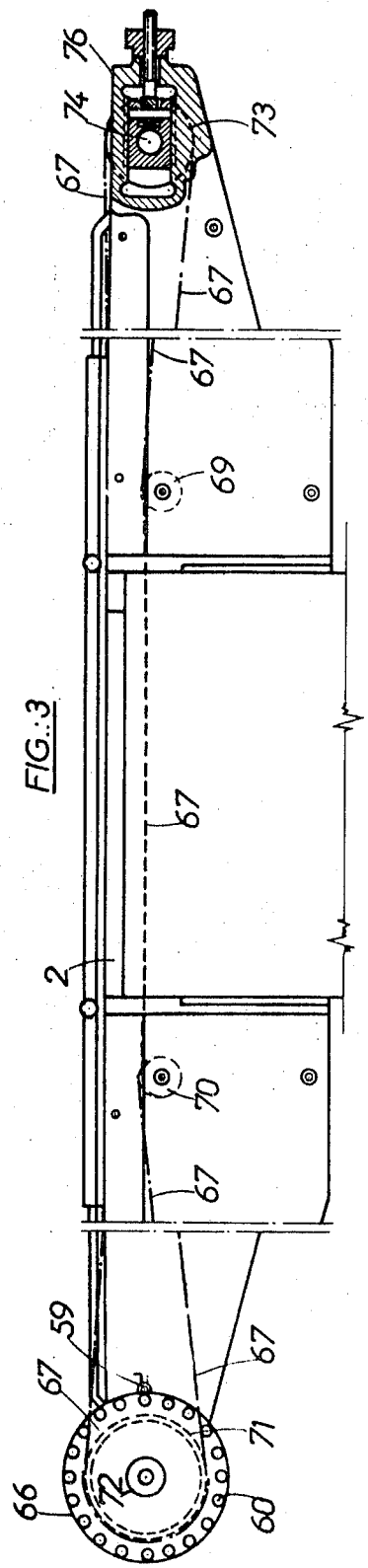
FIG.:3
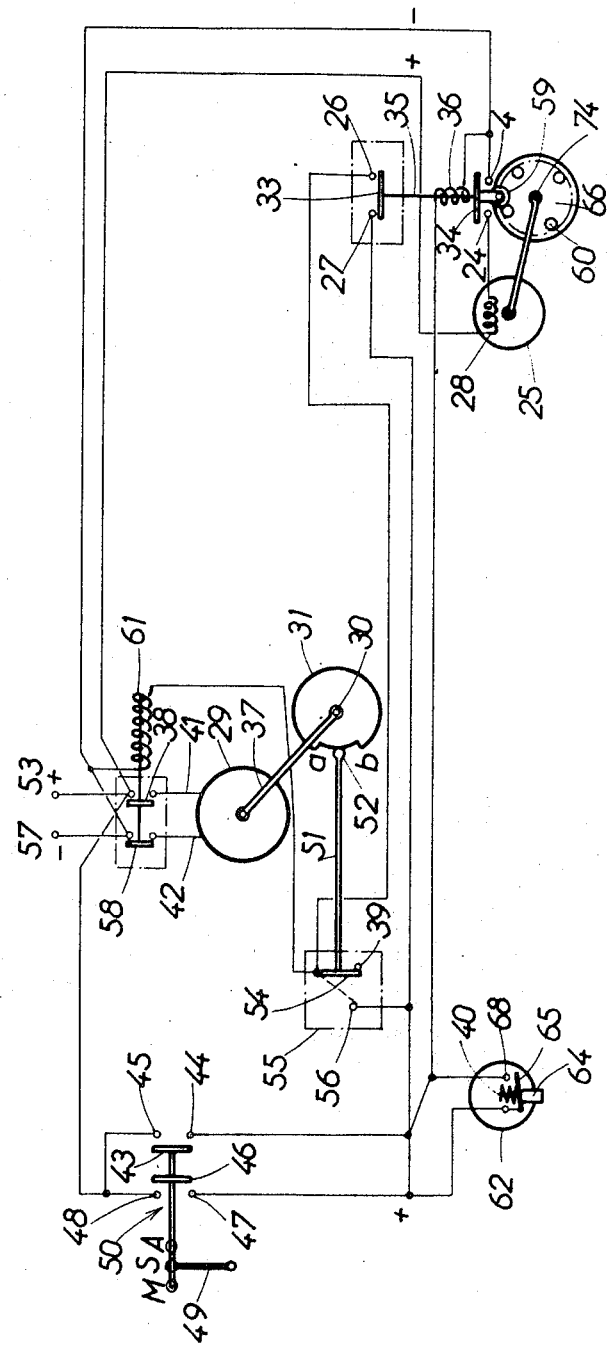
FIG.:4
INVENTOR
FERNAND STANISLAS ALLINQUANT
By Crumpton, Shaw & Stephens
ATTORNEYS

MEAT-TENDERIZING MACHINE

This application is a continuation of my application Ser. No. 756,619, filed Aug. 30, 1968, now abandoned.

This invention relates to a machine for tenderizing meat, of the type comprising an assembly of close fine metal blades which can be driven with a reciprocating movement with respect to a piece of meat placed on a support, so as to penetrate into the meat and to move away therefrom, the penetration having the effect of producing localized cuts which make the meat more tender.

In many cases a single penetration of the blades into the meat is insufficient and many succeeding ones are necessary for the meat to become sufficiently tender. These successive penetrations should be performed at the same places of the meat, since otherwise an important part of the juices contained therein would escape. These penetrations at the same places of course take place if the piece of meat is not moved between two successive penetrations. The piece of meat, however, can be kept stationary only if the whole of it can lie under the machine blades. One object of this invention is to enable the machine blades to penetrate several times into the piece of meat at the same places thereof also when the piece of meat can not wholly lie beneath the assembly of blades.

The machine accordingly to the invention comprises a stationary frame, an horizontal belt conveyor passing through the frame, vertical metal plates rigidly connected together, situated above the conveyor and parallel or perpendicular to the direction of movement of the conveyor, each of which plate is cut out at its lower edge so as to form equidistant vertical parallel blades each of which is sharp at its lower end, the plates being so assembled and cut out that the blades of the different plates on the one hand and the invervals between the blades on the other hand face one another, and electromechanical means adapted to cause a reciprocating movement of the assembly of plates to alternate with a forward movement of the conveyor over a distance equal to a multiple of the distance separating the corresponding vertical edges of two successive blades of the same plate or of two successive plates.

The machine preferably comprises such switching members that depending on the position they are given, the conveyor performs one movement only and the blade plates one reciprocating movement only when the electromechanical device has been started to work or on the contrary the alternating movements of the conveyor and of the blade plates automatically continue until the operation of a stopping device. In both cases the piece of meat is laid on the conveyor at a suitable place before the electromechanical device is started to work.

One embodiment of the machine according to the invention will now be described by way of example having reference to the accompanying drawings in which:

FIG. 1 is a front elevation, partly sectional of the machine;
FIG. 2 is a side elevation of the same machine;
FIG. 3 is a side elevation of the machine conveyor;
FIG. 4 is a diagram of the electromechanical device of the machine;
FIG. 5 is a front view of a portion of the belt conveyor;
FIG. 6 is a side view of this portion.

Referring to the drawings, the machine shown comprises a fixed frame 1 equipped with feet 1a enabling it to be placed on a support, for example a table. This frame 1 carries at the top thereof a slab 2 over which can slide from back to front a belt conveyor 67 which will be described later in greater detail. The conveyor carries the piece of meat to be tenderized.

At the top of the frame 1 and on either side of the slab 2 there are two tubular sleeves 5 serving to guide two vertical rods 6 which together with a lower crosspiece or crosshead 7 and an upper crosspiece or crosshead 8, form a rectangular framework. This framework is movable vertically with respect to the frame 1. It is urged into the upper position shown in FIGS. 1 and 2 by means of springs 9 attached on the one hand, to the frame 1 and on the other hand to lugs 10 fixed to the lower crosspiece 7. Control of the lowering of the framework 6, 7, 8 in order to move it from the position shown in FIGS. 1 and 2 into a lower position is effected by means of a shaft 11 journaled in bearings 12 in the frame and actuated manually by a lever 13 fixed to the shaft. Lever 13 ends in a grip 63 carrying a pushbutton 64 which is urged by a spring and can be easily operated by the thumb of the operator who holds the grip 63.

One the shaft 11 there is keyed a toothed wheel 14 or the type usually used for the purposes of chain transmission and to the periphery of which there is attached, at 15a, a length of chain 15, the other end 15b of which is fixed between the arms of a forked part 16 fast with the crosspiece 7. When, by means of the lever 13, the shaft 11 and the wheel 14 are rotated in the direction of the arrow $f$ in FIG. 2, the chain 15 is wound on the wheel 14 and therefore the part 16 and the frame 6, 7, 8 are lowered in opposition to the springs 9.

A suitable device, consisting for instance in known manner of a ratchet wheel and a pawl, enables to lock the frame 6, 7, 8 in its lower position, but it has been neither described nor shown because it is not concerned by the present invention. The upper position into which the framework 6, 7, 8 is drawn upwardly by the springs 9, when the shaft 11 is released, is determined by the abutment of a lever 17 fast with the shaft 11 against a stop 18 rigid with the fixed frame 1.

On the rods 6 there is a slidably mounted a crosshead 19 resting on two coil springs 20 which are disposed around the respective rods 6 and are masked by an assembly of telescopic sleeves or tubes 21.

This crosshead 19 carries a block 22 of vertically arranged blades. This block is composed of thin parallel steel plates 22 each of which is cut out at its lower edge so as to form vertical equidistant blades 75 sharp at their lower ends. The plates 22 are identical, assembled together by means of a rod 23 inserted in a hole in the plates and they are maintained at the appropriate interval of a few millimeters by spacers (not shown) which are likewise slipped on to the rod 23. The plates are so assembled that the blades of the different plates and likewise the intervals between the blades face one another respectively, so that the blade points form a chequerwork.

These blades pass between the parallel bars of a horizontal grid which guides and protects them and presses on the piece of meat to be tenderized before and after the blades penetrate into it. But this grid is not concerned by this invention and, for the sake of simplicity, it has been neither described nor shown.

On the upper crosspiece 8 of the framework there is fixed an electric motor 29 designed to drive, by way of a train of gears 29a (only the outer casing of which is shown in FIG. 2) the shaft 30, likewise carried by the crosspiece 8 of a plate 31. This plate 31 is articulated at 32 to a connecting rod 32a the opposite end of which is articulated at 32b to the crosshead 19. One revolution of the plate 31 thus results in one reciprocating movement of the crosshead 19.

A small feeler lever 51 is provided at its free end with a roller 52 cooperating with the periphery of the plate 31. The lever 51 is articulated on a pivot 53 and a spring (not shown) acts on it to keep the roller 52 in contact with the periphery of the plate 31. This periphery comprises an arc $a-b$, the radius of which is smaller than the radius of the remainder of the plate 31, the said arc $a-b$ extending over an angle of about 30° to 50°. When the articulation 32 and therefore also the crosshead 19 are in their uppermost positions, the roller 52 is about in the middle of arc $a-b$.

In FIG. 3, 74 denotes a horizontal driving shaft bearing several cylinders 73. 72 is a horizontal shaft parallel to shaft 74, situated at about the same level and bearing several cylinders 71. 70 and 69 are two intermediate guiding drums parallel to the shafts 74 and 72. The belt conveyor 67 passes over the cylinders 73 and 71, its lower side passes over the drums 70 and 69 and its upper side glides over plate 2. 76 is a device for adjusting the tension of conveyor 67. 66 is a disk mounted on an end of shaft 72, outside the conveyor 67. The disk 66 can bear equidistant removable studs 60. In the embodiment shown, the disk 66 can carry up to 20 studs, all of which have been shown. Each stud is a small cylinder having a circular cross section. When the disk 66 rotates, each of the studs 60 carried by the disk 66 engages a roller 59 urged by a spring and pushes it outwardly. The number of the studs, the diameter of the circle along which they are placed and the diameter of the cylinders 71 are chosen such that the circumferential distance over cylinder 71 between the points where the radii corresponding to two successive studs cross this cylinder is a multiple of the blade step in a given blade plate, that is, of the horizontal distance between the corresponding vertical edges of two successive plate blades. In that part of the piece of meat into which the blades penetrate both before and after a movement of the conveyor the places of the piece of meat where blades penetrate into the meat are then the same.

The conveyor is preferably provided with a plurality of holes or consists of a flexible lattice so as to allow the escape of blood. It may be made in known manner of a plurality of wires generally at right angles to the lengthwise direction of the conveyor and hinged to one another. FIGS. 5 and 6 show a portion of such a belt conveyor. It is made of identical steel rods such as 78a, 78b and 78c each of which comprises a succession of lengthwise sections 81 alternating with generally perpendicular sections 77, each rod 78b being interlaced with the two adjacent ones 78a and 78c at its two ends and at the junction places such as 79 and 80 between two succeeding sections 81 and 77. The two outermost lengthwise sections 81 mesh with indented wheels carried by the outermost cylinders 73.

Referring now to FIG. 4, 57 and 53 are the two terminals of a source of direct electric current which is supplied to the machine. 50 is a switch comprising a lever 49 which may be as desired placed in any one of three positions S (stop), M (manual) and A (automatic). In position M the two contacts 48 and 47 are connected by plate 46 and in position A the two contacts 45 and 44 are connected by plate 43. No connection at all is established in position S.

62 is a switch placed in the operating grip 63 of lever 13. 65 is a lever urged to its operating position by spring 40 and which, when it is pushed by pushbutton 64, causes contact to take place at 68.

55 is an electric contactor containing a rest contact 39, a work contact 56 and a lever 54 connected to the feeler lever 51. The contact is opened in contactor 55 when roller 52 is in arc a–b of plate 31 and closed when roller 52 is not in this arc.

42 and 41 are the two terminals of the motor 29. They are connected to terminals 57 and 53 over the armatures 58 and 38 of an electromagnet, the excitation winding of which is 61. 37 shows schematically the connection between motor 29 and plate 31.

36 is a winding of a relay and its excitation causes the sliding in the downward sense (in the Figure) of a shaft 35 bearing two armatures 34 and 33 and whose lower end bears the roller 59, 25 is a motor connected to the driving shaft 74 of the conveyor 67. The excitation winding 28 of the motor 25 is connected to one, 24, of two contacts 24 and 4 which are connected by armature 34 when shaft 35 has slided downwardly. 27 and 26 are two other contacts which are connected by armature 33 when roller 59 is over a stud 60 of disk 66 and therefore has been lifted.

The different above-described parts of FIG. 4 are connected together by leads as shown by the Figure. The machine operates as follows:

1. Lever 49 is in position S. All circuits are opened at switch 50.

2. Lever 49 is in position M. Contacts 48 and 47 are therefore connected. It is assumed that the disk 66 rotates (in FIG. 4) counterclockwise. As explained below, a stud 60 has just passed under roller 59 and is near it on its left as shown. The operator pushes pushbutton 64 after having lowered lever 13 and the connection is thus established at 68. Winding 36 is excited, contact takes place between 4 and 24, the winding 28 of motor 25 is excited and motor 25 rotates bringing about the displacement of belt conveyor 67 carrying the piece of meat 3 to be tenderized. When a stud 60 passes under roller 59 and lifts it, shaft 35 slides upwardly, the connection is opened at 4, 24 and the excitation winding 28 of motor 25 is no longer excited. Motor 25, however, still rotates through inertia so that the stud 60 which had lifted roller 59 does not remain under it and stops only beyond and near it as shown. Motor 25 and therefore also conveyor 67 then stop. At the same time as connection had been set up at 4, 24 the winding 61 of motor 29 had been excited over contacts 27 and 26, motor 29 and therefore also plate 31 had started rotating. Roller 52 leaves arc a–b of plate 31 soon afterwards, contact is set up at 56 by lever 54 and the operator can release pushbutton 54, current then flowing through contactor 55. Motor 29 runs on until roller 32 has fallen back into arc a–b. Crosshead 19 has then come back to its uppermost position shown in FIGS. 1 and 2 after having performed a reciprocating movement. A further operation of pushbutton 64 enables to carry out a new cycle of operations.

3. Lever 49 is in position A. Contact is therefore established at 45, 44, the excitation circuit of winding 36 shunts switch 62 and is permanently established and cycles of operation identical with the cycle described above under number 2 succeed one another automatically without it being necessary to operate pushbutton 64.

As already mentioned above, FIG. 3 shows a disk 66 bearing 20 positions for studs 60. It will be assumed by way of numerical example that each blade plate 22 comprises 20 blades and that the blade step is 4 mm., so that the plate 22 is 80 mm. broad. It will also be assumed, for the sake of simplicity, that, contrary to what appears from FIG. 3, the circle on which the studs 60 are placed has the same diameter as the cylinder 71. Disk 66 conveniently has a periphery of 80×4=320 mm. If disk 66 bears four equidistant studs 60, thus circumferentially one-fourth circle, that is 80 mm. distant, the piece of meat will be tenderized once only. If disk 66 bears 20 studs, that is one stud at each position, it will be tenderized five times. It is not possible to tenderize the piece of meat exactly two, three or four times over its entire length because none of numerals 2, 3 and 4 exactly divides 5. A midway is therefore adopted. If the 20 possible positions of the studs on disk 66 are numbered 1 to 20 it is for instance possible to adopt for 2, 3 and 4 tenderizing operations the following numbers of studs and following positions respectively:

2—8—1, 4,—6, 9, 11, 14, 16, 19
3—10—1, 3, 5, 7, 9, 11, 13, 15, 17, 19
4—16—1, 2, 3, 4, 6, 7, 8, 9, 11, 12, 13, 14, 16, 17, 18, 19.

If 24 positions instead of 20 were available, the other figures and dimensions remaining those mentioned above, the piece of meat could be tenderized exactly one, two, three or six times over its entire length with 4, 8, 12 or 24 studs respectively, because 2 and 3 divide 6.

The arrangement and the operation of the machine would be exactly the same if the blade plates 22 were perpendicular and not parallel to the direction of advancement of the conveyor 67.

I claim:

1. In a meat-tenderizing machine having an assembly of evenly spaced, flat blades, said assembly being driven downward to pierce a piece of meat and retracted upward out of said meat, and including a horizontal belt conveyor arranged for moving pieces of meat under said blade assembly and means for moving said conveyor in a stepped advance alternating with said movement of said blade assembly, the improvement comprising a. a first motor means for driving said blade assembly, and a second motor means for moving said conveyor, said first and second motor means being distinct from each other;
b. electromechanical means including circuit means for correlating said first and second motor means; and
c. said conveyor moving means being arranged under control of said electromechanical correlating means for advancing said conveyor only a prefixed distance equal to a multiple of the spacing interval of said blades in said assembly along the path of motion of said conveyor.

2. The meat-tenderizing machine of claim 1 wherein said plates are transverse to said path of motion of said conveyor and said spacing interval is the distance between the centerlines of successive ones of said plates.

3. The meat-tenderizing machine of claim 1 wherein said plates are aligned with said path of motion of said conveyor, and said spacing interval is the distance between the centers of successive ones of said blades.

4. The meat-tenderizing machine of claim 1 wherein said correlating means comprises a cylinder rotating with movement of said conveyor; electrical switch means in the region of said cylinder; and members on said cylinder for operating said switch means.

5. The meat-tenderizing machine of claim 4 wherein said members are concentric with said cylinder and evenly spaced.

6. The meat-tenderizing machine of claim 4 wherein said members are removable.

7. The meat-tenderizing machine of claim 4 wherein said members are studs engaging said switch means.

8. The meat-tenderizing machine of claim 4 wherein said switch means includes a roller biased to engage said members.

* * * * *